United States Patent [19]

Baur

[11] Patent Number: 4,949,027

[45] Date of Patent: Aug. 14, 1990

[54] ARRANGEMENT FOR AND METHOD OF OPERATING AN ELECTRIC STEP MOTOR

[75] Inventor: Reinhard Baur, Kippenheim, Fed. Rep. of Germany

[73] Assignee: Gerhard Berger GMBH & Co. KG Fabrik Elektrisher Geräte, Lahr, Fed. Rep. of Germany

[21] Appl. No.: 327,066

[22] Filed: Mar. 22, 1989

[30] Foreign Application Priority Data

Mar. 23, 1988 [DE] Fed. Rep. of Germany ....... 3809657

[51] Int. Cl.$^5$ .............................................. H02P 8/00
[52] U.S. Cl. ..................................... 318/696; 318/685
[58] Field of Search ................................. 318/696, 685

[56] References Cited

U.S. PATENT DOCUMENTS

| 4,072,888 | 2/1978 | Bechtle et al. | 318/685 |
| 4,426,608 | 1/1984 | Larson et al. | 318/685 |
| 4,761,598 | 8/1988 | Lovrenich | 318/685 |

FOREIGN PATENT DOCUMENTS

| 2321941 | 11/1974 | Fed. Rep. of Germany . |
| 2421219 | 11/1975 | Fed. Rep. of Germany . |
| 3441451 | 5/1986 | Fed. Rep. of Germany . |
| 117776 | 1/1977 | German Democratic Rep. . |
| 131213 | 6/1978 | German Democratic Rep. . |

Primary Examiner—William M. Shoop, Jr.
Assistant Examiner—Saul M. Bergmann
Attorney, Agent, or Firm—Peter K. Kontler

[57] ABSTRACT

An electric step motor has a sensor which functions to sense the position of the rotor. The sensor has an output which is connected to a first input of a unit for measuring lead angle. The measuring unit has an output which is coupled to a first input of a comparator having a second input which is connected to a selector for choosing a desired lead angle. The comparator is connected to an input of, and functions to regulate, a pulse generator which is set to emit pulses at a constant frequency equal to the rated operating frequency of the motor. The pulse generator has an output which is connected to a drive circuit for the motor, and such output is further connected to a second input of the measuring unit. The measuring unit informs the comparator of the actual lead angle. The comparator compares the actual lead angle with the desired lead angle established by the selector and activates the pulse generator accordingly. The pulse generator thereupon emits a specified number of pulses at the rated operating frequency of the rotor thereby causing the rotor to move. The comparator deactivates the pulse generator when no further displacement of the rotor is required.

10 Claims, 2 Drawing Sheets

ARRANGEMENT FOR AND METHOD OF OPERATING AN ELECTRIC STEP MOTOR

The invention relates generally to an electric motor, especially an electric step motor.

More particularly, the invention relates to an arrangement for and method of establishing the lead angle in an electric step motor having a sensor for detecting the position of the rotor. An arrangement of the type under consideration generally has an output for stepping pulses, i.e., pulses which respectively cause the rotor to move through a certain angle, and an input for a desired lead angle. The term "lead angle" denotes the angle between the field axes of the rotor and stator. The output of the arrangement is connected to a drive circuit which controls the motor and the drive circuit, in turn, is connected to the motor.

Arrangements of the above character which allow self-synchronizing operation of a step motor are known. When a starting pulse, and hence a pulse for advancing the rotor, is generated in such an arrangement, the rotor position sensor emits a sensing pulse after the rotor has actually reached its prescribed position.

It is known to accelerate the motor using so-called pulse injection by which additional pulses are interposed between the rotor advancing pulses on the other hand, the motor is braked by omitting pulses. A problem arises with pulse injection in that the earlier transition to the next excited condition brings with it the danger of exceeding the permissible frequency range and rotor displacement. For this reason, the additional pulses are delayed by one-half step. It follows that there are difficulties in incorporating one or more additional pulses in an existing stream of pulses. In order to permit injection of additional pulses injected beyond those required for the desired rotor displacement, the sensing pulses coming from the rotor position indicator can have a frequency equal to only one-half of the maximum operating frequency of the motor. This limits the operating range of the motor.

To reduce the possibility of disturbances, a filter is normally disposed at the input of the motor drive circuit so as to block disturbing pulses. The variable frequency of the motor advancing pulses requires an appropriate filter design which, however, does not provide optimum protection against disturbances.

The West German Offenlegungsschrift No. 34 41 451 discloses an arrangement for operating a step motor 1 having a rotor position indicator 13. Clocking pulses from an input 3 are admitted to a pulse processing circuit 7 via a gate 5 while directional pulses from an input 9 are likewise transmitted to the pulse processing circuit 7. The pulse processing circuit 7 has two outputs V and R which are connected to respective positive and negative inputs of a subtracting and counting unit 11 and respectively represent forward and backward rotation of the rotor. The subtracting and counting unit 11 counts the difference between the clocking pulses and the sensing pulses from the rotor position indicator 13 and, depending upon the result, emits an appropriate signal at an output 17 thereof. The subtracting and counting unit 11 has a second output which is connected to an output stage 23 via a conductor 25 and a third output which is connected to the gate 5. The signals from the third output control the gate 5 in such a manner that the clocking rate decreases as the difference in the subtracting and counting unit 11 increases.

The output 17 of the unit 11 is connected to a pulse generator 19 which, in turn, has a pair of outputs V and R. The pulse generator 19 issues positive pulses, negative pulses or no pulses depending on the signal from the output 17. Each of the outputs V and R is connected to a respective input of a driver circuit 21 and a second subtracting and counting unit 27. The driver circuit 21 has an output coupled to the output stage 23 which, in turn, has an output connected to the step motor 1. The driver circuit 21 functions to change the phases of the pulses emitted by the output stage 23 while the signals arriving at the output stage 23 from the subtracting and counting unit 11 operate to increase the amplitude of the pulses from the stage 23 as the difference in the subtracting and counting unit 11 increases. The rotor position indicator 13 transmits sensing pulses to a detector 15 which senses the direction of rotation of the rotor, and also to a regulator 31 which establishes a maximum power angle. The detector 15 has a pair of outputs V and R each of which is connected to a respective input of the subtracting and counting unit 11 and the subtracting and counting unit 27. In addition to the sensing pulses from the rotor position indicator 13, the regulator 31 receives signals from both the pulse processing unit 7 and the subtracting and counting unit 27. The regulator 31 and the subtracting and counting unit 27 are connected to respective inputs of a lead angle limiting circuit 29 which, in turn, is coupled to an input of the pulse generator 19. The lead angle limiting circuit 29 compares the instantaneous lead angle, which is obtained from the subtracting and counting unit 27, with the maximum lead angle from the regulator 31 and adjusts the pulse generator 19 accordingly.

The arrangement of the West German Offenlegungsschrift No. 34 41 451, in which the pulse generator is blocked when the instantaneous lead angle becomes equal to the maximum lead angle, still does not operate entirely satisfactorily.

OBJECTS OF THE INVENTION

It is an object of the invention to provide a regulating arrangement for an electric step motor which permits utilization of substantially the entire operating range of the motor.

Another object of the invention is to provide a regulating arrangement which allows acceleration and braking of an electric step motor to be simplified.

An additional object of the invention is to provide a regulating arrangement which enables an electric step motor to develop a torque at least approximating the maximum possible torque whenever the motor operates.

A further object of the invention is to provide a regulating arrangement which, particularly during acceleration and braking of an electric step motor, makes it possible to achieve an optimum lead angle with little difficulty so that the maximum possible torque may always be generated in half steps at a given current and over the full frequency range of the motor.

It is also an object of the invention to provide a regulating method which allows substantially the entire operating range of an electric step motor to be utilized.

A concomitant object of the invention is to provide a regulating method which enables acceleration and braking of an electric step motor to be simplified.

Yet another object of the invention is to provide a regulating method which permits an electric step motor to develop a torque at least approximately equal to the maximum possible torque whenever the motor operates.

Still a further object of the invention is to provide a regulating method which, especially during acceleration and braking of an electric step motor, makes it possible to achieve an optimum lead angle with little difficulty so that the maximum possible torque may always be generated in half-steps at a given current and over the full frequency range of the motor.

SUMMARY OF THE INVENTION

The preceding objects, as well as others which will become apparent as the description proceeds, are achieved by the invention.

One aspect of the invention resides in an arrangement for operating an electric step motor having a rotor, particularly for establishing the lead angle of the motor. The motor includes a sensor which functions to sense the position of the motor and has an output, and the motor is driven by a driver having an input as well as an output which is connected to the motor. The a comprises a measuring unit for the measurement of lead angle. The measuring unit has a first input connectable to the output of the sensor, as well as a second input and an output. The output of the measuring unit is connected to a first input of a comparator which again has a second input as well as an output. The second input of the comparator, is designed to receive data representing a desired lead angle while the output of the comparator is connected to the input of a pulse generator. The pulse generator has an output which is coupled to the second n of the measuring unit and is connectable to the input of the driver. The comparator is operable to activate and deactivate the pulse generator, and the pulse generator is set to operate at a fixed frequency.

The arrangement of the invention with its pulse generator always allows the pulses for advancing the rotor to be emitted at the same frequency. This frequency preferably equals the rated or maximum operating frequency of the motor. The pulses may be emitted as discrete pulses or pulse packets until a stream of pulses with maximum frequency is formed. In virtually direct contrast to the known pulse injection procedure, the invention employs a stream of pulses which are issued by the pulse generator at a fixed frequency, advantageously the rated or maximum operating frequency of the motor. The emission of pulses is inhibited at appropriate time intervals to reduce the lead Another aspect of the invention resides in method of operating an electric step motor having a variable lead angle. The motor includes a rotor and the method comprises establishing at least one desired lead angle. The difference between the actual lead angle and this desired lead angle is determined using a measuring unit and a plurality of control pulses is generated at a fixed frequency based on such difference. The rotor is driven using the pulses and, in addition, the pulses are transmitted to the measuring unit.

Driving of the rotor may be performed using a driver for the motor and the pulses are then also transmitted to the driver. The motor may be supplied with an essentially constant current.

The torque of the motor may be varied varying the lead angle. A desired lead angle may be established by means of a desired lead angle selector which may generate a signal representative of the desired lead angle. The method may involve rapidly moving the rotor through a desired angle so that the rotor assumes a desired position and such rapid movement may be performed over the entire operating range of the motor. The method may further comprise establishing a second desired lead angle and the signal indicative of the first desired lead angle is then preferably maintained by the lead angle selector until the process of establishing the second desired lead angle is initiated.

The novel features which are considered as characteristic of the invention are set forth in particular in the appended claims. The construction and mode of operation of the improved regulating arrangement, as well as the improved step motor operating method, will, however, be best understood upon perusal of the following detailed description of certain specific embodiments when read in conjunction with the accompanying drawings.

DESCRIPTION OF PREFERRED EMBODIMENTS

Figure 1:
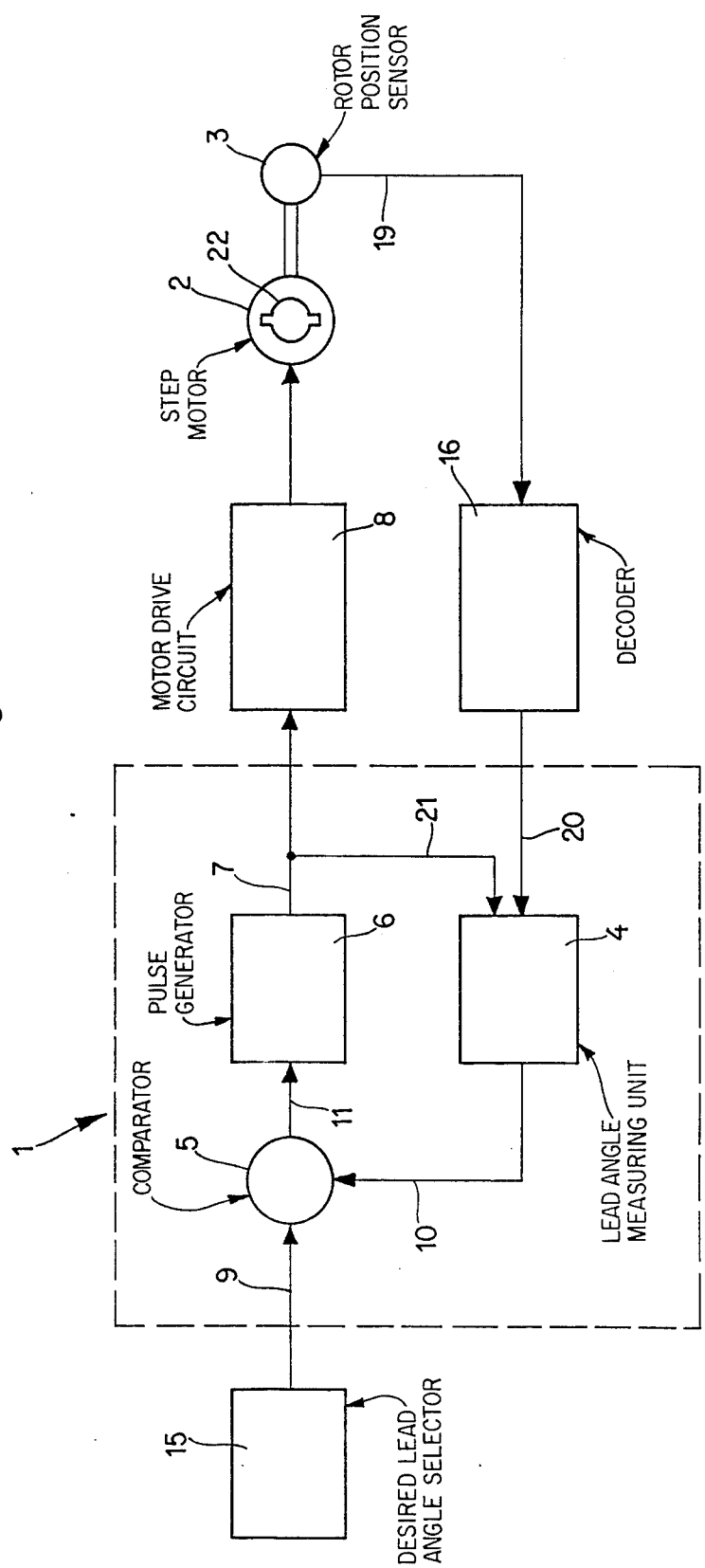
FIG. 1 is a block diagram of an arrangement according to the invention for operating an electric step motor.

Referring to FIG. 1, the reference numeral 2 identifies an electric step motor. The step motor 2 includes or is connected to an encoder 3 which serves to sense the angular position of a rotor 22 constituting part of the step motor 2.

The reference numeral 1 indicates generally indicates an arrangement for establishing the lead angle of the step motor 2. This arrangement, which may be referred to as a regulating or operating arrangement for the step motor 2, includes a unit 4 for measuring the power angle or angular displacement to be undergone by the rotor 22. The measuring unit 4 has a first input 20 and a second input 21, and the encoder or rotor position sensor 3 has an output 19 which is connected to the first input 20 of the measuring unit 4 via a decoder 16. The measuring unit 4 is also provided with an output.

The regulating arrangement 1 further includes a comparator 5 having a first input 10, a second input 9 and an output. The first input 10 of the comparator 5 is connected to the output of the measuring unit 4 while the second output 9 is designed to receive data representing a desired lead angle. To this end, the second input 9 of the comparator 5 may be connected to a selector 15 which allows a desired lead angle to be selected and then entered in the comparator 5. The selector 15 and the regulating arrangement 1 are preferably designed in such a manner that the data representing the desired lead angle are entered in the comparator 5 in the form of a binary code. The selector 15 may be considered to be a regulator for regulating the position of the rotor 22. By varying the desire lead angle via the selector 15, the torque of the motor may be varied.

The output of the comparator 5 is connected to an input 11 of a pulse generator 6 which also constitutes part of the regulating arrangement 1. The pulse generator 6 is set to operate at a fixed frequency, preferably the rated or maximum operating frequency of the step motor 2. Thus, when the pulse generator 6 is activated, it emits a stream of pulses at a fixed frequency. The comparator 5 functions to activate the pulse generator 6 for specified time intervals as well as to deactivate the pulse generator 6.

The pulse generator 6 has an output 7 which is disconnected to an input of a motor drive circuit 8. The motor drive circuit 8, which has an output coupled to the motor 2, serves to drive the motor 2. The motor 2 is preferably supplied with a substantially constant current.

The output 7 of the pulse generator 6 is further connected to the second input of the measuring unit 4. Accordingly, the signals delivered by the measuring unit 4 to the input 10 of the comparator 5 denote the actual lead angle of the motor 2.

Figure 2:
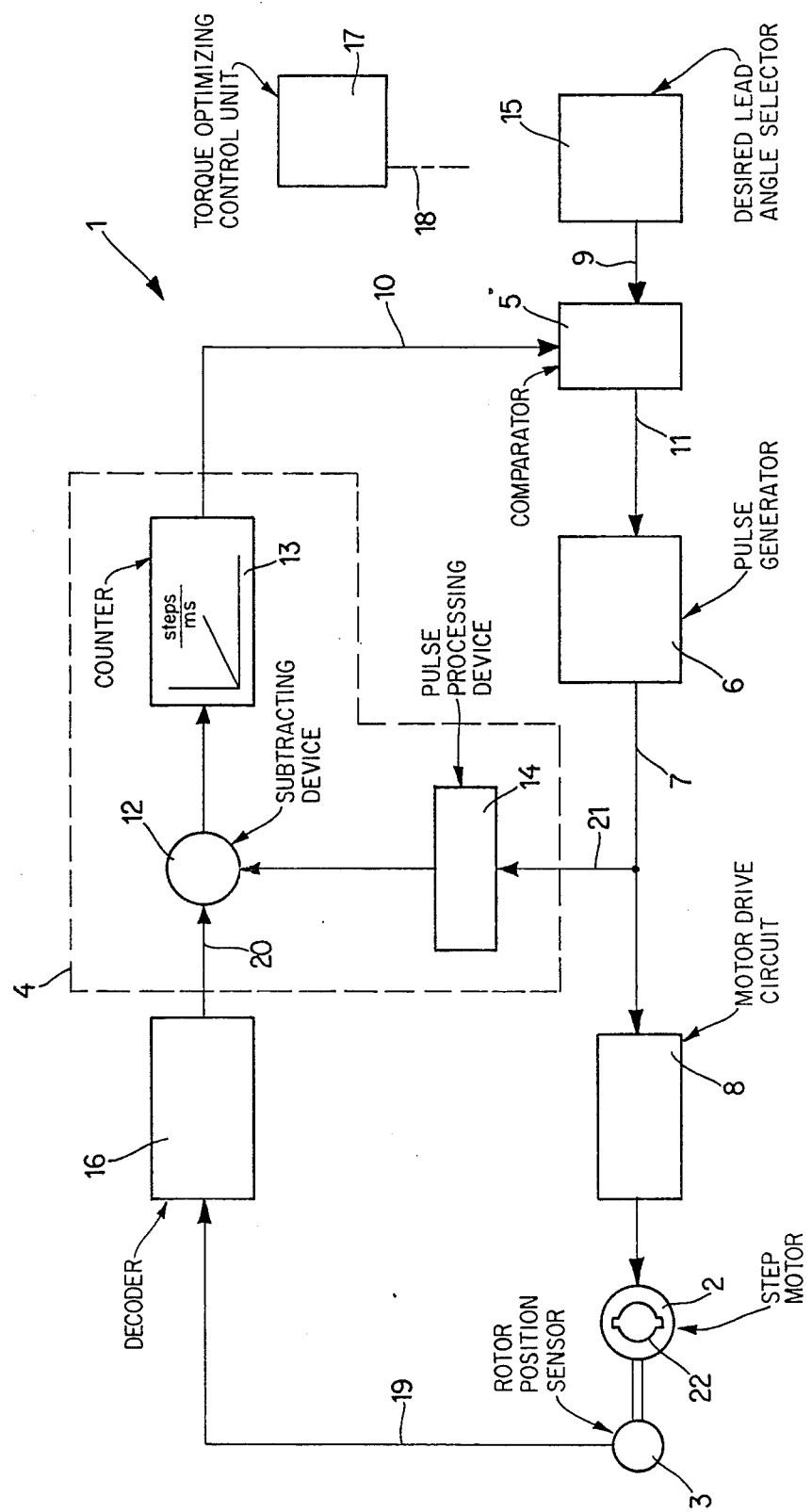
FIG. 2 is similar to FIG. 1 but shows additional details of the arrangement.

FIG. 2 shows the principal components of the measuring unit 4. As illustrated, the measuring unit 4 includes a subtracting device 12 having a pair of inputs as well as an output. One of the inputs of the subtracting device 12 is constituted by the first input 20 of the measuring unit 4 and is thus connected to the output 19 of the rotor position sensor 3. The other input of the subtracting device 12 is connected to the output 7 of the pulse generator 6 via a pulse processing or adjusting device 14 likewise constituting part of the measuring unit 4. The pulse processing or adjusting device 14 is optional. The rotor position sensor 3 emits sensing pulses representative of the position of the rotor 22 and the subtracting device 12 serves to determine the difference between the number of pulses issued by the pulse generator 6 and the number of pulses issued by the rotor position sensor 3.

The measuring unit 4 further includes a counter 13 having an input which is coupled to the output of the subtracting device 12. The counter 13 has an output constituted by the output of the measuring unit 4 and connected to the input 10 of the comparator 5.

As best seen in FIG. 1, the regulating arrangement 1 is interposed in a regulating circuit constituting part of an apparatus for adjusting the lead angle of the motor 2.

The regulating circuit of FIGS. 1 and 2 operates as follows:

It is assumed that the motor 2 is initially inoperative. The instantaneous lead angle is thus zero so that the rotor 22 is not urged to un displacement. Similarly, it is assumed that the selector 15 initially generates a zero signal, that is, the desired lead angle is are initially zero.

The selector 15 now generates a signal indicative of a desired lead angle. By way of example, it is assumed that the desired lead angle corresponds to a rotor displacement of five half-steps. It will be observed that the desired lead angle established by the selector 15 is equivalent to the establishment of a desired position for the rotor 22. When the signal generated by the selector 15 is transmitted to the comparator 5, the latter determines that a deviation of five half-steps exists between the current position of the rotor 22 and its desired position. Thus, the input 9 of the comparator 5 receives a signal indicative of a desired rotor displacement of five half-steps while the input 10 of the comparator receives a zero signal. Accordingly, the output of the comparator 5 sends a signal to the input 11 of the pulse generator 6 thereby activating the pulse generator 6. The output 7 of the pulse generator 6 then emits pulses at a fixed frequency which is here assumed to correspond to the rated or maximum operating frequency of the motor 2, e.g., 100 kHz.

The output pulses from pulse generator 6 are transmitted directly to the motor drive circuit 8 and, at the same time, are transmitted to the subtracting device 12 via the pulse processing device 14. The output of the subtracting device 12 generates a difference signal representing the difference between the number of pulses entering the subtracting device 12 from the rotor position sensor 3 via the decoder 16 and the number of pulses entering the subtracting device 12 from the pulse generator 6 via the pulse processing device 14. The difference signal from the subtracting device 12 is sent to the counter 13 which establishes a count indicative of the difference between the actual position of the rotor 22 and the intended position of the rotor 22 as prescribed by the stream of pulses delivered to the motor drive circuit 8. The count established by the counter 13 corresponds to the actual value of the lead angle. The output of the counter 13 generates a signal representative of this count and such signal is forwarded to the comparator 5.

Assuming that the inertia of the rotor 22 has so far prevented the rotor 22 from moving, the lead angle of the motor 2 following the first pulse emitted by the pulse generator 6 corresponds to one half-step. The difference between the actual lead angle of the motor 2 and the desired lead angle is thus now only four half-steps. This procedure continues until there is no longer any difference between the actual lead angle of the motor 2 and the desired lead angle.

Once the inertia of the rotor 22 has been overcome and the decoder 16 generates a signal indicative of a step, this signal denotes a step performed by the rotor 22. The lead angle of the motor 2 is reduced accordingly. However, this reduction in the lead angle of the motor 2 is counteracted by the lead angle comparison being carried out in the comparator 5 so that, in practice, the rotor 22 assumes its desired position within a short adjustment period, that is, the rotor 22 rapidly undergoes a displacement to its desired position. By virtue of this lead angle regulation, the motor 2 can no longer cut out and can always produce the maximum possible torque.

The fresh data arriving from the pulse generator 6 and representing the steps to be performed by the rotor 22, together with the fresh data arriving from the decoder 16 and representing the steps which were actually carried out by the rotor 22, is processed by the subtracting device 12 fully asynchronously and within a time period no greater than the interval between two consecutive pulses of a stream of pulses emitted by the pulse generator 6, i.e., within a time period equal to or less than one-half cycle of the output frequency of the pulse generator 6. By designing the subtracting device 12 for fully asynchronous processing of fresh data within a time period no greater than one-half cycle of the frequency of the pulse generator 6, it becomes possible to immediately establish a new lead angle or rotor position anywhere within the range of operating frequencies of the motor 2. The transition to the new lead angle or rotor position can take place without interrupting the emission of pulses by the pulse generator 6, that is, without deactivating the pulse generator 6, until the new lead angle or rotor position has been set. Thus, when the selector 15 generates a signal representing a first desired lead angle or rotor position and the rotor 22 is to move to a second position immediately after arrival at the first position, the rotor 22 rapidly moves to the first position while the selector 15 maintains the signal relating to the first position. This signal is maintained until a new signal representing the second position is generated by the selector 15. Consequently, even at very high rotational speeds of the rotor, a torque opposite to the direction of rotation of the rotor 22 can be produced in order to brake the rotor 22 at a maximum rate and to then accelerate the rotor 22 in the opposite direction. Rapid movement of the rotor 22 to a desired position can be achieved over the entire range of operating frequencies of the motor 2.

An auxiliary control unit 17 may be provided to calculate the optimum lead angle as a function of the rotational speed of the rotor 22. The control unit 17 has an output 18 which is connected to the regulating circuit and updates the latter on the optimum lead angle so that the motor 2 develops the maximum possible torque at all frequencies in its range of operating frequencies.

The regulating circuit of the invention exhibits significant differences from that of the West German Offenlegungsschrift No. 34 41 451 discussed earlier. Thus, the input 9 of the regulating circuit according to the invention receives a desired lead angle in the form of a binary code. This lead angle maintained by the regulating circuit under all circumstances. On the other hand, the input signal for the regulating circuit of the Offenlegungsschrift, which is derived from the output 17 of the subtracting and counting unit 11, indicates solely whether positive pulses, negative pulses or pulses of zero magnitude are to be generated. The actual pulses are produced by the pulse generator 19 and transmitted to the driver circuit 21 and the output stage 23. The subtracting and counting unit 27 determines the instantaneous lead angle and sends the value of this angle to the lead angle limiting circuit 29. Taking into account the actual speed of the motor 1, the lead angle limiting circuit 29 calculates the largest permissible lead angle. If the actual lead angle threatens to exceed the largest permissible lead angle, the pulse generator 19 is blocked.

Furthermore, in the regulating circuit of the invention, a strictly linear relationship exists between the desired value at the input 9 of the comparator 5 and the actual value at the input 10. The regulating circuit in accordance with the invention can thus function strictly as a commutator. In the Offenlegunsschrift, this linear relationship is not present. An arbitrary lead angle which cannot be directly adjusted is derived. The value of this lead angle is monitored by the lead angle limiting unit 29 and, if necessary, is limited (non-linearity). The regulating circuit of the Offenlegungsschrift is accordingly unable to function strictly as a commutator.

In summary, the regulating circuit of the invention and that of the Offenlegungsschrift have fundamentally different purposes and functions. The regulating circuit of the Offenlegungsschrift generates an arbitrary number of pulses as long as the maximum value prescribed by the lead angle limiting circuit 29 is not exceeded. Moreover, the regulating circuit of the Offenlegungsschrift cannot be used as a commutator. On the other hand, in the regulating circuit according to the invention, a precisely defined number of pulses having a linear relationship to the desired lead angle at the input 9 of the comparator 5 is emitted at the output 7 of the pulse generator 6. The regulating circuit of the invention can thus fulfill its purpose as a commutator.

The regulating circuit in accordance with the invention and the regulating circuit of the Offenlegungsschrift also differ from a purely technical viewpoint since they have different input and output values.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An arrangement for operating an electric step motor which includes a rotor, and a sensor for sensing the position of said rotor and having an output, said motor being driven by a driver having an input, and an output connected to said motor, and said arrangement comprising a lead angle measuring unit having a first input connectable to said output of said sensor, a second input and an output; a comparator having a first input conencted to said output of said measuring unit, a second input and an output, said second input of said comparator being designed to receive data representing a desired lead angle; and a pulse generator having an input connected to said output of said comparator and an output connected to said second input of said measuring unit and connectable to said input of said driver, said comparator being operative to activate and deactivate said pulse generator, and said pulse generator being set to operate at a fixed frequency.

2. The arrangement of claim 1, wherein said motor has a maximum operating frequency and said pulse generator is set to operate at such frequency.

3. The arrangement of claim 1, wherein consecutive pulses emitted by said pulse generator at said fixed frequency are separated by a predetermined time interval and said measuring unit is designed to process incoming data within a period at most equal to one-half of said predetermined time interval.

4. The arrangement of claim 1, wherein said measuring unit includes a subtracting device having one input connectable to said output of said sensor, another input connected to said output of said pulse generator and an output, said measuring unit also including a counter having an input connected to said output of said subtracting device.

5. The arrangement of claim 4, wherein said measuring unit further includes a pulse adjusting device connected to said other input of said subtracting device.

6. The arrangement of claim 1, further comprising a control unit for optimizing the torque of said motor.

7. A method of operating an electric step motor having a rotor, comprising the steps of establishing at least one desired lead angle; determining the difference between the actual lead angle and said one desired lead angle using a measuring unit; generating a plurality of control pulses at a fixed frequency based on said difference; transmitting said pulses to said measuring unit; and driving said rotor using said pulses.

8. The method of claim 7, wherein the driving step is performed using a driver for said motor and said pulses are transmitted to said driver.

9. The method of claim 7, wherein the driving step comprises supplying said motor with a substantially constant current.

10. The method of claim 9, wherein the establishing step comprises generating a signal representative of said one desired lead angle and the driving step comprises rapidly moving said rotor to such lead angle; and further comprising the step of establishing another desired lead angle, said signal being maintained until the step of establishing said other desired lead angle is initiated.

* * * * *